D. Brooks.
Telegraph Insulator.
No. 2,717. Reissued Aug. 6, 1867.
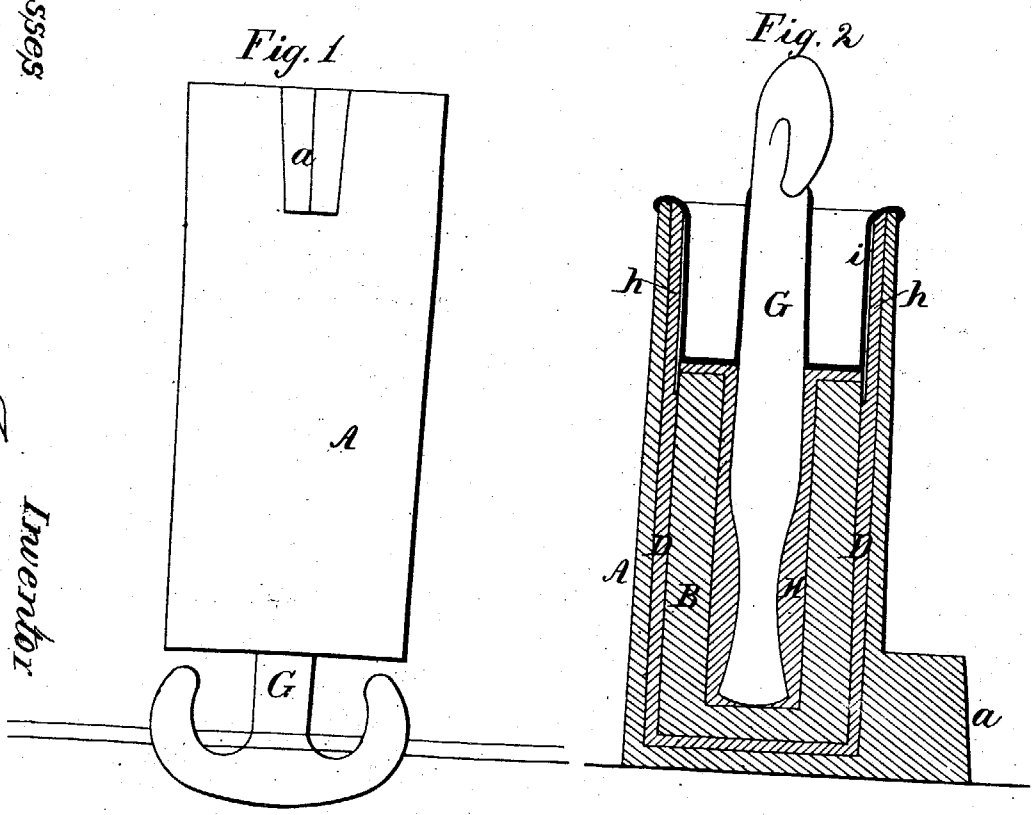
Witnesses
W. Albert Stull
Charles Hurron
Inventor
Henry Howson
Atty for D. Brooks

UNITED STATES PATENT OFFICE.

DAVID BROOKS, OF PHILADELPHIA, PENNSYLVANIA.

IMPROVEMENT IN INSULATORS FOR TELEGRAPH-WIRES.

Specification forming part of Letters Patent No. 45,221, dated November 29, 1864; Reissue No. 2,717, dated August 6, 1867.

*To all whom it may concern:*

Be it known that I, DAVID BROOKS, of Philadelphia, Pennsylvania, have invented an Improvement in Insulators for Telegraph-Wires; and I do hereby declare the following to be a full, clear, and exact description of the same.

My invention consists of the improved mode, fully described hereinafter, of constructing insulators for telegraph-wires, whereby the holder to which the wire is attached is effectually insulated, and the inconveniences resulting from the collection of water on and about the insulators during rainy and foggy weather are obviated.

In order to enable others skilled in the art to make and use my invention, I will now proceed to describe its construction and operation, reference being had to the accompanying drawings, which forms a part of thich specification, and in which—

Figure 1 is an exterior view of an insulator for telegraph-wires constructed according to my improvement; and Fig. 2, a vertical section of the insulator inverted.

A is the exterior cast-iron casing of the insulator, the projection *a* of which serves as a means of attachment to the arm of telegraph-pole.

B is a cylindrical block of glass, between which and the interior of the casing A intervenes a body, D, of sulphur, the glass being considerably shorter than the casing. In this glass block is a circular opening for the reception of the wire-holder G, which is secured by a mass of sulphur, H, the stem of the holder being made concave at opposite sides, so that it cannot be withdrawn from the glass by the weight or tension of the wires.

In preparing my improved insulators, I in the first instance place the glass on a table or slab and pour into the opening melted sulphur, and then deposit the stem of the wire-holder G in the opening of the glass, which is perfectly secured to the holder when the sulphur has become hard by cooling. After this I cement to the upper edge of the glass a strip of paper, *h*, made in the form of a hollow cylinder, when the glass with its wire-holder is ready for attachment to the casing A. In order to do this, I in the first instance heat the casing and then pour into the same a suitable quantity of molten sulphur, and in this I deposit the glass block with its paper cylinder *h*. As the latter extends to the upper edge of the casing A, there will necessarily be a body of sulphur between the said casing and the paper. The sulphur and paper at the upper edge of the casing A are then trimmed off, after which, while the insulator is still in an inverted position, molten paraffine is poured into the space above the glass within the paper cylinder until the space is full and the paper and sulphur have become thoroughly saturated with the paraffine. The insulator is then inverted and the greater portion of the molten paraffine is poured out, the remainder adhering to the paper and to the upper edge of the casing and sulphur, care being taken that the coating *i* of paraffine extends over the edge of the casing. When the coating of paraffine has congealed the insulator is ready for being attached to the pole in the position seen in Fig. 1.

Although sulphur affords an excellent medium for securing the wire-holder to the glass and the latter to the exterior casing of the insulator, and although when dry it is a comparatively good non-conductor of electricity, it has a great affinity for water, with which, during rains or fogs, it soon becomes charged to such an extent as to neutralize its non-conducting properties; hence during rainy weather electric currents would pass from the edge of the casing to the wire-holder and through the paper were it not for the paraffine, which penetrates the sulphur and paper, adheres to the surface of the same, and effectually prevents these materials from absorbing moisture, while the surface of the paraffine is much less liable to become coated with moisture than the surface of glass, sulphur, or other materials. The stem of the wire-holder is also coated with paraffine, and when paraffine of the best quality cannot be obtained, and is consequently liable to melt at a low temperature, it may be protected by a coating of varnish applied to the surface.

I claim as my invention and desire to secure by Letters Patent—

1. The use, in the manner described, of a hollow cylinder, *h*, of paper or its equivalent, in connecting the glass block B to the casing A by means of sulphur.

2. The use of the paraffine as an insulating medium in telegraphic-wire insulators, in the manner described, or in any other manner by which the same result is attained.

3. The use, in connection with telegraph-wire insulators, of sulphur or other porous cement saturated with paraffine.

In testimony whereof I have signed my name to this specification before two subscribing witnesses.

DAVID BROOKS.

Witnesses:

CHARLES E. FOSTER,
W. J. R. DELANEY.